United States Patent [19]

VanGulick

[11] 3,755,261

[45] Aug. 28, 1973

[54] CURING OF AMINE CURABLE POLYMERS DIAMINES WITH COMPLEXES OF SELECTED AND ALKALI METAL SALTS

[75] Inventor: Norman Martin VanGulick, Wilmington, Del.

[73] Assignee: E. I. du Pont de Nemours and Company, Wilmington, Del.

[22] Filed: May 1, 1972

[21] Appl. No.: 249,714

[52] U.S. Cl..... 260/77.5 AM, 260/2 N, 260/46.5 R, 260/47 EN, 260/79.1, 260/91.5, 260/91.7, 260/92.3, 260/92.8, 260/75 NH
[51] Int. Cl............................................ C08g 22/00
[58] Field of Search............... 260/77.5 AM, 75 NH, 260/47 EN, 2 N, 91.5, 91.7, 92.3, 92.8 A, 79.1, 46.5 R

[56] References Cited

UNITED STATES PATENTS 3,527,744   9/1970   Baker et al. .................... 260/94.7 N
3,565,972   2/1971   Harris.......................... 260/77.5 AM Primary Examiner—Donald E. Czaja
Assistant Examiner—M. J. Welsh
Attorney—Michael Conner

[57] ABSTRACT

Amine curable polymers are cured effectively by the use of complexes of 4,4'-methylene dianiline and/or racemic 2,3-di-(4-aminophenyl) butane and selected alkali metal salts including sodium chloride.

16 Claims, No Drawings

CURING OF AMINE CURABLE POLYMERS DIAMINES WITH COMPLEXES OF SELECTED AND ALKALI METAL SALTS

BACKGROUND OF THE INVENTION

The curing of amine-curable polymers, such as isocyanato-terminated polyurethane prepolymers, epoxy resins and millable halogen-containing hydrocarbon polymers, is well known. In the past, curing has generally involved mixing the amine curing agent with the curable polymer by means suitable for the materials involved and forming the mixture into a useful form, followed by a heating step to complete the curing reaction. A problem which is encountered in this prior art procedure is the premature reaction of the curing agent with the curable polymer during the mixing step and during the interval following milling until the forming operation is completed. The problem posed by premature reaction or curing varies widely in degree for different amine curing agent/polymer systems, but must be taken into consideration in most instances. In more reactive systems such as those employing isocyanato-terminated polyurethane prepolymers the problems resulting from prereaction have previously necessitated the use of special low residence time mixers and selected diamines of reduced reactivity as curing agents, thereby markedly reducing the properties of the vulcanizates.

Thus there is a need for an economical, efficient process for curing such prepolymers or polymers in the absence of premature reaction.

In essence, the curing of polymers effected with amines is thought to involve chain extension of a prepolymer or cross-linking of a polymer itself. In the case of the urethane and epoxy polymers, a prepolymer is generally transformed from a viscous liquid having a molecular weight of less than about 3,000 to a solid having a molecular weight in excess of 10,000. The solids range from rubbery materials to hard plastics with a wide variety of known uses, e.g., molded tires, machine parts and potting compositions. In the case of amine curable millable gums such as polychloroprene, the gum is converted to a cross-linked elastomer with valuable physical properties.

SUMMARY OF THE INVENTION

According to this invention it has unexpectedly been found that despite their typically high melting points, e.g., 150° to 250°C. a complex of 4,4'-methylene dianiline (MDA) and/or racemic 2,3-di(4-aminophenyl) butane may effectively be utilized to cure amine curable polymers without a premature reaction, between the curable prepolymer or polymer and the aforementioned diamines, taking place. The curing agent is prepared by forming a complex between the 4,4'-methylene dianiline and a salt, the salt being selected from nitrites and halides, except that fluorides, of sodium and lithium and sodium cyanide or by forming a complex between racemic 2,3-di(4-aminophenyl) butane and a halide salt, except the fluoride, of sodium, potassium; rubidium and cesium. Specifically, the compositions to be utilized as curing agents for amine curable polymers include the reaction products of 4,4'-methylene dianiline with the following salts, in the ratio of 3 moles of methylene dianiline to 1 mole of salt: sodium chloride, sodium bromide, sodium iodide, sodium nitrite, lithium chloride, lithium bromide, lithium iodide, lithium nitrite and sodium cyanide, and the reaction products of racemic 2,3-di(4-aminophenyl) butane with the following salts in the ratio of 3 moles of diamine to 1 mole of salt: sodium chloride, sodium bromide, sodium iodide, potassium chloride, potassium bromide, potassium iodide, rubidium chloride, rubidium bromide, rubidium iodide, cesium chloride, cesium bromide and cesium iodide.

Because of availability and cost, the complexes derived from 4,4'-methylene dianiline are preferred and those in which the salt is sodium chloride or lithium chloride are especially preferred. In the discussion which follows reference will generally be made only to the complexes of 4,4'-methylene dianiline, but it is understood that they would apply equally as well to the complexes of racemic 2,3-di(4-aminophenyl) butane.

There are a variety of methods for preparing the complexes of the instant invention.

In one method for preparing the complexes of this invention, an aqueous solution or brine containing a sodium or lithium salt selected from the class consisting of the chloride, bromide, iodide and nitrite is reacted with 4,4'-methylene dianiline (also referred to hereinafter as MDA), either in a solvent, having a degree of mutual solubility for both water and for the MDA, such as an alcohol, or with solid MDA in the substantial absence of a solvent. If the salt is present in relatively dilute concentration, for example between about 1 percent and about 12 percent by weight, a solvent for the MDA preferably is employed. If the salt is present in concentration above about 12 percent by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100°C., depending on the volatility of the solvent.

In the solvent method of preparing the complexes, a relatively dilute aqueous solution (1 to 12 percent by weight salt) of a sodium or lithium salt selected from the group comprising the chloride, bromide, iodide, and nitrite may be mixed with a solution of 4,4'-methylenedianiline in a suitable solvent, e.g., methanol, at a temperature in the range from about 20° to 60°C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12 percent by weight of salt) is employed, solid crystalline MDA may be added to the salt solution with agitation at a somewhat higher temperature in the range of from about 50°C. to 90°C. in an amount somewhat in excess of the stoichiometric quantity required to react with that amount of salt which is present in excess of about 12 percent by weight. Under these conditions three mols of MDA react with one mol of salt to form a crystalline precipitate which may be separated from the remaining solution by filtration, decantation, centrifuging or other suitable operation.

Complexes of other salts, such as sodium nitrite may be formed by substantially the same procedures outlined for the sodium chloride complexes.

The complex after it is formed may then be utilized for the curing of amine curable prepolymers or polymers; typical of these polymers are the urethanes. Other prepolymers or polymers which may be cured with the complex of the instant invention include methylene following:

1. Epoxy resins such as those disclosed in the "Encyclopedia of Polymer Science and Technology" Interscience Publishers, New York (1967), Volume 6, pps. 212–221. The curing of certain epoxy resins with methylene dianiline is described in U.S. Pat. No. 2,773,048 to Formo et al. In the present process, the amine complex can be used in equivalent amounts to those suggested for the free diamine by U.S. Pat. No. 2,773,048 and the "Encylopedia of Polymer Science and Technology", Volume 6, pps. 226–230.

2. Halogen-containing hydrocarbon polymers such as chloroprene polymers, chlorinated butyl rubber and chlorinated polyethylene and polypropylene. Chloroprene polymers are described in the "Encyclopedia of Polymer Science and Technology", Volume 3, (1965), pps. 705–728. Chlorinated butyl rubber and its curing by diamines is described in British 815,939. In curing halogen-containing polymers of these types with the complex used in the instant process, it is customary to include a metal oxide acid acceptor such as zinc oxide.

The curing or cross-linking of hydrofluorinated polymers with polyamines is disclosed in U.S. Pat. No. 2,979,490 to West.

3. Chlorosulfonated polymers such as those described in U.S. Pat. No. 2,723,257 to McAlevy, which patent relates to the curing of such polymers with aromatic diamines including methylene dianiline.

4. Polymers containing acid halide groups such as

and haloformate groups, such as

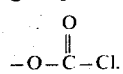

The curing of these polymers with methylene dianiline is analogous to the curing of chlorosulfonated polymers.

5. Polymers containing anhydride groups which on reaction with diamines yield amide-acid linkages.

6. Organopolysiloxanes such as described in U.S. Pat. No. 2,938,010 to Bluestein, which patent relates to the use of diamines as curing agents for organopolysiloxanes.

All patents and articles referred to above are herein incorporated by reference.

The prepolymers and/or polymers are admixed with the complexes described above and then cured by standard techniques.

DETAILED DESCRIPTION

Since the urethanes (that is, prepolymers and polymers containing isocyanato groups) are typical polymers which may be cured by the process of the instant invention a more detailed description of the curing procedure with the urethanes will be included; it should be emphasized that there is no intention to limit the invention, however, to the urethanes but rather all amine-curable polymers and prepolymers of which the above-mentioned are representative are intended to be within the scope of the instant invention.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3,000 to upwards of about 10,000. Examples of such polymers are described in U.S. Pat. Nos. 2,620,516, 2,777,831, 2,843,568, 2,866,774, 2,900,368, 2,929,800, 2,948,691, 2,948,707, 3,114,735; herein incorporated by reference.

Prior to curing operation itself, mixing and/or milling of the polyurethane with finely divided particles of the complex is required. Typically, the complex particle size is 1 to 150 microns, preferably 2 to 20 microns. Grinding of the complex can be accomplished in standard grinding equipment such as the fluid energy mill and vertical hammer mills employing air classification to remove ground material from the mill.

Mixing of the finely divided complex with liquid prepolymers can be accomplished in dough mixers, high-speed impellers mixers, paddle-type mixers and the like. For best results it is preferred that the mix found in the foregoing types of mixers be further mixed (or the complex dispersed) by use of a three-roll mill such as is used in paint and ink manufacture. Improved dispersions can also be prepared in colloid mills. These various types of mixers and mills are described in "The Encyclopedia of Chemical Process Equipment", W. J. Mead, Reinhold (1964).

In the use of a solid type polyurethane polymer or gum which is to be cured, the complex may be dispersed on a rubber mill or in an internal mixer (a Banbury Mixer). Once the gum has been banded on the mill or broken down in the internal mixer, the finely ground complex can be added directly and milling or mixing continued until a uniform dispersion has been prepared.

In mixing the complex with either fluid prepolymers or millable gums the temperature must be kept below the decomposition point of the complex in order to avoid the possibility of premature curing. In the present process, the decomposition point of the complex is a function of the particular complex being used and the polyer in which the complex is dispersed. For isocyanato-terminated urethane prepolymers and the sodium chloride complex of methylene dianiline, mixing should be performed below 80°C and preferably below about 50°C.

The temperature to be utilized during the curing of urethanes will be about 90°–180°C. Temperature is not particularly critical but it must be above the temperature at which the complex dissociates in the system being cured; this temperature will also vary with each particular complex. The complex between sodium chloride and 4,4'-methylenedianiline begins to dissociate at about 90°C. in a urethane system.

Full curing will ordinarily take about 1 minute to 24 hours depending on the temperature for urethanes when utilizing the MDA/sodium chloride complex. Preferred curing conditions range from ½ – 12 hours at temperatures ranging from about 100°–150°C. At these preferred curing temperatures sufficient cure to permit demolding occurs within about 5 seconds to 5 minutes because of the high reactivity of the MDA once it has been liberated from the complex. In the present process, the high reactivity of MDA becomes advantageous, whereas this reactivity prevented any practical use of MDA by prior art curing procedures in which gellation occurred before uniform mixing of free MDA and prepolymer could be accomplished. The present process provides unlimited time for mixing, prolonged storage of the mixture and ample time for filling the most complex of molds coupled with almost instant gellation permitting demolding as soon as the mixture is heated.

Curing times vary with other polymer systems as previously indicated. In general, cure times recommended for prior art curing processes using free diamines are satisfactory for the present process because recommended cure temperatures are generally in excess of the decomposition point of the complex. For epoxy resins, cure times of 15 seconds to 15 minutes at temperatures of 120°C. to 190°C. are suggested. For halogen-containing hydrocarbon polymers times of about 1 minute to 2 hours at temperatures of about 100° to 220°C. are suggested. Similar conditions can be used for chlorosulfonated polyethylene.

It is believed that the reactions which take place in the present curing process are identical to those which occur when free MDA is used as a curing agent by prior art curing procedures.

The curing equipment and curing procedures used in the present process are conventional.

The following examples are illustrative of the present invention and therefore are not intended in any way as a limitation on the scope thereof. Parts and percents are by weight unless otherwise indicated.

EXAMPLES

The following ASTM methods are employed for determining the physical properties of the cured polymers prepared in the examples.

| | |
|---|---|
| Modulus at 100% Elongation, $M_{100}$ | D412 |
| Modulus at 200% Elongation, $M_{200}$ | D412 |
| Modulus at 300% Elongation, $M_{300}$ | D412 |
| Modulus at 400% Elongation, $M_{400}$ | D412 |
| Modulus at 500% Elongation, $M_{500}$ | D412 |
| Tensile at Break, $T_B$ | D412 |
| Elongation at Break, $E_B$ | D412 |
| Permanent Set at Break, $S_B$ | D412 |
| Trouser Tear | D470* |
| Hardness, Shore A | D676 |
| Hardness, Shore D | D1484 |
| Bashore Rebound | D1054 |

* A 1.5"×3" rectangular test specimen having a 1.5 " cut on the long axis is used to prevent "necking". The sample was pulled at 50 inches per minute.

Preparation of 4,4'-Methylene Dianiline/NaCl Complex

A solution of 250 g. of 4,4'-methylenedianiline in 1,000 ml of methanol at 50°C. was mixed with a solution of 50 g of sodium chloride in 250 ml. of water, also at 50°C. The mixture was cooled to 25°C. and crystals of the complex were collected on a coarse fritted filter funnel and washed 3 times with a total of 500 ml. of cold 80% methanol/20% water by volume solution. The crystals were air dried at about 25°C. Analysis: C,71.4%; H, 6.5%. Calc.: C, 71.7%; H, 6.5%.

The crystals were ground in a micronizer to yield finely divided complex having a mean particle diameter of about 1-2 microns.

EXAMPLE 1

To 200 grams of a prepolymer prepared by reacting 2 moles of 2,4-tolylene diisocyanate with 1 mole of polytetramethylene ether glycol (number average molecular weight about 980) at 80°C. for 3 hours was added 31.4 grams of the finely divided complex of MDA and NaCl prepared hereinbefore. The complex was mixed with the prepolymer to form a pre-mix which was then converted to a uniform dispersion by 7 passes through a three-roll ink mill.

The resulting thick, smooth dispersion did not gel after storage for 1 month.

Slabs of cured material for test purposes were prepared from the dispersion by molding in a press for 30 minutes at 130°C. The resulting slabs were translucent and uniform in appearance. Physical properties of the cured material are tabulated below.

| | |
|---|---|
| $M_{100}$, psi | 1500 |
| $M_{200}$, psi | 2000 |
| $M_{300}$, psi | 3000 |
| $M_{400}$, psi | 5100 |
| $T_B$ , psi | 6700 |
| $E_B$ , % | 445 |
| $S_B$ , % | 8 |
| Trouser tear, pli | 490 (average) |
| Hardness, Shore D | 48 |
| Bashore Rebound, % | 39 |

The above characteristics are substantially typical for a cured prepolymer

EXAMPLE 2

The following materials were mixed on a rubber mill at 50°C.

| Compounding Agents | Parts |
|---|---|
| Polychloroprene Polymer — Prepared from the formulation given in "Synthetic Rubber", Whitby, John Wiley & Sons (1954) page 770, substantially by the procedure in "Encyclopedia of Polymer Science and Technology" Interscience, (1965), pps. 711–712. | 100 |
| N-Phenyl-α-naphthyl amine | 2.0 |
| Stearic Acid | 0.5 |
| Magnesia, Calcined | 4.0 |
| SRF Carbon Black | 29 |
| MDA/NaCl Complex, described hereinbefore | 1.25 |
| Zinc Oxide | 5.0 |

The resulting formulation was cured for 30 minutes at 142°C. to yield a vulcanizate having the following physical properties

| | |
|---|---|
| $M_{300}$, psi | 1425 |
| $M_{500}$, psi | 2500 |
| $T_B$ , psi | 2825 |
| $E_B$ , % | 565 |
| Hardness, Shore A | 62 |

Again the resulting cured product has typical characteristics for a cured product of this type.

EXAMPLE 3

Example 1 is duplicated with the exception that racemic 2,3-di(4-aminophenyl) butane is substituted for 4,4'-methylene dianiline; substantially the same results as achieved in Example 1 are found.

I claim:

1. A process for curing an amine curable polymer or prepolymer selected from the group consisting of urethanes containing free isocyanato groups, epoxy resins, halogen-containing hydrocarbon polymers, chloro sulfonated polymers, polymers containing acid halide and haloformate groups, polymers containing anhydride groups which on reaction with diamines, yield amide-acid linkages and organopolysiloxanes which comprises curing said polymer with a complex selected from the group consisting of a complex of 4,4-methylenedianiline and a salt, the salt being selected from the group consisting of sodium chloride, sodium bromide, sodium iodide, sodium nitrite, lithium chloride, lithium bromide, lithium iodide, lithium nitrite and sodium cyanide, and a complex of racemic 2,3-di(4-aminophenyl) butane with a salt, said salt being selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, the ratio of said dianiline or said butane to said salt in said complex being 3 moles to 1 mole.

2. A process for curing an amine curable polymer or prepolymer selected from the group consisting of urethanes containing free isocyanato groups, epoxy resins, halogen-containing hydrocarbon polymers, chloro sulfonated polymers, polymers containing acid halide and haloformate groups, polymers containing anhydride groups which on reaction with diamines, yield amide-acid linkages and organopolysiloxanes which comprises curing said polymer or prepolymer with a complex of 4,4'-methyledianiline and a salt, the salt being selected from the group consisting of sodium chloride, sodium bromide, sodium iodide, sodium nitrite, lithium chloride, lithium bromide, lithium iodide, lithium nitrite and sodium cyanide, the ratio of said dianiline to said salt in said complex being 3 moles to 1 mole.

3. The process of claim 2 wherein said prepolymer or polymer is a urethane containing free isocyanato groups.

4. The process of claim 3 wherein said curing takes place at a temperature of about 100°–150°C.

5. The process of claim 4 wherein said curing takes place for a period of about 5 minutes to 24 hours.

6. The process of claim 4 wherein said complex is derived from 4,4'-methylene dianiline and sodium chloride.

7. The process of claim 6 wherein said complex is derived from 4,4'-methylene dianiline and lithium chloride.

8. The product of claim 1.

9. The product of claim 2.

10. The product of claim 4.

11. The product of claim 6.

12. A composition of matter comprising a mixture of particles of a complex dispersed in an amine curable prepolymer or polymer selected from the group consisting of urethanes containing free isocyanato groups, epoxy resins, halogen-containing hydrocarbon polymers, chloro sulfonated polymers, polymers containing acid halide and haloformate groups, polymers containing anhydride groups which on reaction with diamines, yield amide-acid linkages and organopolysiloxanes, said complex selected from the group consisting of racemic 2,3-di(4-aminophenyl)butane and a salt, said salt being selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, and 4,4'-methylenedianiline and a salt, said salt being selected from the group consisting of sodium chloride, sodium bromide, sodium iodide, sodium nitrite, lithium chloride, lighium bromide, lithium iodide, lithium nitrite and sodium cyanide, the ratio of said dianiline and said butane to said salt in said complexes being 3 moles to 1 mole.

13. A composition of matter comprising a mixture of particles of a complex dispersed in an amine curable prepolymer or polymer selected from the group consisting of urethanes containing free isocyanato groups, epoxy resins, halogen-containing hydrocarbon polymers, chloro sulfonated polymers, polymers containing acid halide and haloformate groups, polymers containing anhydride groups which on reaction with diamines, yield amide-acid linkages and organo-polysiloxanes, said complex comprising 4,4'-methylenedianiline and a salt, said salt being selected from the group consisting of sodium chloride, sodium bromide, sodium iodide, sodium nitrite, lithium chloride, lithium bromide, lithium iodide, lithium nitrite and sodium cyanide.

14. The composition of claim 13 wherein said particles of complex are about 1 to 150 microns in size.

15. The composition of claim 13 wherein said amine curable prepolymer or polymer is urethane containing free isocyanato groups.

16. The composition of claim 15 wherein said salt is sodium chloride.

* * * * *

UNITED STATES PATENT OFFICE
CERTIFICATE OF CORRECTION

Patent No. 3755261                Dated August 28, 1973

Inventor(s) NORMAN MARTIN VAN GULICK

It is certified that error appears in the above-identified patent and that said Letters Patent are hereby corrected as shown below:

Title, substitute --CURING OF AMINE CURABLE POLYMERS WITH COMPLEXES OF SELECTED DIAMINES AND ALKALI METAL SALTS-- for "CURING OF AMINE CURABLE POLYMERS DIAMINES WITH COMPLEXES OF SELECTED AND ALKALI METAL SALTS".

Column 3, lines 8 and 9, "methylene" should read -- the --.

Signed and sealed this 19th day of March 1974.

(SEAL)
Attest:

EDWARD M. FLETCHER, JR.
Attesting Officer

C. MARSHALL DANN
Commissioner of Patents